United States Patent
Lansley et al.

(10) Patent No.: US 8,085,617 B2
(45) Date of Patent: Dec. 27, 2011

(54) SYSTEM AND METHOD FOR REDUCING THE EFFECTS OF GHOSTS FROM THE AIR-WATER INTERFACE IN MARINE SEISMIC EXPLORATION

(75) Inventors: Roy Malcolm Lansley, Bellville, TX (US); Madjid Berraki, Marseilles (FR); Jean-Charles Ferran, Houston, TX (US)

(73) Assignee: Sercel Inc., Houston, TX (US)

( * ) Notice: Subject to any disclaimer, the term of this patent is extended or adjusted under 35 U.S.C. 154(b) by 587 days.

(21) Appl. No.: 12/262,385

(22) Filed: Oct. 31, 2008

(65) Prior Publication Data

US 2010/0110829 A1    May 6, 2010

(51) Int. Cl.
*G01V 1/38* (2006.01)
*B63B 35/08* (2006.01)

(52) U.S. Cl. .......................... 367/15; 114/40

(58) Field of Classification Search ............. 367/15–25, 367/1, 191; 114/40, 42, 61.1, 253
See application file for complete search history.

(56) References Cited

U.S. PATENT DOCUMENTS

| | | | |
|---|---|---|---|
| 3,005,438 A * | 10/1961 | Muldowney | 114/253 |
| 4,188,905 A * | 2/1980 | Weller et al. | 114/253 |
| 4,625,302 A | 11/1986 | Clark | |
| 4,632,213 A | 12/1986 | Domenico | |
| 4,729,333 A * | 3/1988 | Kirby et al. | 114/244 |
| 5,513,149 A * | 4/1996 | Salmi et al. | 367/1 |
| 5,611,294 A * | 3/1997 | Burg | 114/61.1 |
| 5,959,938 A | 9/1999 | Behrens | |
| 6,529,445 B1 | 3/2003 | Laws | |
| 6,775,618 B1 | 8/2004 | Robertsson | |
| 2004/0240318 A1 | 12/2004 | Drake et al. | |

* cited by examiner

*Primary Examiner* — Jack Keith
*Assistant Examiner* — Krystine Breier
(74) *Attorney, Agent, or Firm* — Law Office of Tim Cook P.C.

(57) ABSTRACT

A system mechanically alters the geometry of the surface of the water by breaking the water surface with a mechanical device. The mechanical device may comprise a plurality of propellers, a plurality of aquafoils in the shape of plows, a wire whip, or other mechanical device to reduce the coefficient of reflectivity of the air-water interface.

4 Claims, 10 Drawing Sheets

SYSTEM AND METHOD FOR REDUCING THE EFFECTS OF GHOSTS FROM THE AIR-WATER INTERFACE IN MARINE SEISMIC EXPLORATION

FIELD OF THE INVENTION

The present invention relates generally to the field of apparatus and methods of reducing the effects of sea-surface ghost reflections in seismic data during the acquisition of such data, and, more particularly, to a system and method for breaking up the reflective sea surface to either deflect or disperse seismic energy impacting the sea surface.

BACKGROUND OF THE INVENTION

The problems associated with the introduction of ghosts in marine seismic exploration are well known. To date, almost all proposed solutions to this problem have been directed to filtering the seismic data acquired and manipulating the filtered data. Such data techniques have worked well on synthetic data, for ghosts introduced at the sea-surface and ocean bottom interfaces, but have been less successful in practice.

As described in Robertsson et al., U.S. Pat. No. 6,775,618, removing the ghost reflections from seismic data is for many experimental configurations equivalent to up/down wavefield separation of the recorded data. In such configurations, the down-going part of the wavefield represents the ghost and the up-going wavefield represents the desired signal. Exact filters for up/down separation of multi-component wavefield measurements in ocean bottom cable (OBC) configurations have been derived by Amundsen and Ikel, and are described in U.K. Patent Application Number 9800741.2. In fact, PGS has deployed a dual sensor component system for operation. See, e.g., U.S. Pat. No. 7,359,283 and U.S. Pat. No. 7,239,577. Apart from the difficulty with poles and zeros at critical wave numbers, they also require knowledge about the properties of the immediate sub-bottom locations as well as hydrophone/geophone calibration and coupling compensation. This drawback is even more problematic for downgoing signals from the air-sea interface.

A normal incidence approximation to the de-ghosting filters for data acquired at the sea floor was described by Barr, F. J. in U.S. Pat. No. 4,979,150. However, this technique is not as effective when the angle of incidence is away from vertical. Also, this technique does not completely correct for wide-angle scattering and the complex reflections from rough sea surfaces. Additionally, although known systems have used dual sensor streamers with a gimbaled velocity geophone and a group of hydrophones, such systems still suffer from a ghost effect on the source spectrum. In another application, a computer system and method for eliminating the effects of ghost reflections from marine seismic survey traces obtained via ocean bottom cables was suggested by Corrigan in U.S. Pat. No. 5,696,734.

Robertsson et al. thus suggested an improved de-ghosting method and system that utilized multi-component marine seismic data recorded in a fluid medium. The method made use of two types of data: pressure data that represented the pressure in the fluid medium, such as sea water, at a number of locations; and vertical particle motion data that represented the vertical particle motion of the acoustic energy propagating in the fluid medium at a number of locations within the same spatial area as the pressure data. The vertical particle motion data can be in various forms, for example, velocity, pressure gradient, displacement, or acceleration. A spatial filter separated up and down propagating acoustic energy over substantially the entire range of non-horizontal incidence angles in the fluid medium. The spatial filter was applied to either the vertical particle motion data or to the pressure data, and then combined with the other data to generate pressure data that has its up and down propagating components separated.

Unfortunately, this and other techniques in the art are based on the premise that the acquired data includes reflected noise which must be dealt with. In other words, techniques in the art attempt to remove the ghosts once they reach the receiver of the seismic system. After removing the effects of ghosting at the receiver locations, even with an effective filter, the effects of the ghost on the seismic source spectrum still remain. This reduces the amplitude of the seismic source spectrum at the low frequencies and in the vicinity of the ghost notches that occur at frequencies that are at integer multiples of $v/2d$, where $v$=acoustic velocity of the water and $d$=the depth of the source array. This adversely affects the signal to noise ratio at these frequencies. Norris, et al, in WO 2008/005001, state "Method and apparatus for producing a bubble curtain with a diversity of bubble diameters for purposes such as modifying the characteristics of a seismic source such as is used in seismic surveys." It is understood that this bubble curtain has been deployed above a source array in order to attenuate the ghost effects at said source. In "The Marine Seismic Source" by G. E. Parkes and L. Hatton Fig. 4.6 p 75 they teach "The top far field measurement was made in good weather and the bottom measurement in poor weather. The reduced ghost size due to surface roughness is evident." Therefore, there remains a need for a system and method of reducing the noise effects at the source, and the system disclosed herein is directed to filling this long felt need in the art.

SUMMARY OF THE INVENTION

Stated simply, in order to reduce the ghost effects of the air-water interface, this system mechanically alters the geometry of the surface of the water by breaking the water surface with a mechanical device. Preferably, the system is deployed laterally between, outboard of, and in advance of sub-arrays of a seismic source array. This reduces the reflectivity of the air-water interface located above an airgun array during the step of shooting the air guns, or other appropriate source of a seismic signal. By reducing the reflectivity of the air-water interface, the amount of energy reflected from this surface is reduced. The system provides a means of reducing the ghost effect related to the seismic source. Reducing the ghost effect better preserves the low frequency part of the source spectrum and that in the vicinity of the ghost notches that occur at frequencies that are at integer multiples of $v/2d$, where $v$=acoustic velocity of the water and $d$=the depth of the source array.

In a first preferred embodiment, a set of plows, which may be referred to as "aquafoils", are towed among the other seismic array components, thereby perturbing the surface of the water around the array. This effect creates relative large-scale alterations in the air-water interface, yet these alterations are small relative to the wavelengths of the seismic signal. In another embodiment, passive propellers are rotated by the movement of the vessel through the water. This motion creates small-scale ripples in the water surface. When the seismic energy strikes the rippled surface, the energy is dispersed, rather than reflected, and thus less downward going energy is received at the sensors of the seismic streamers.

In another preferred embodiment, a set of rotating wire whips are drawn through the water, thereby beating the surface of the water, for even smaller-scale ripples in the water surface.

Finally, in each of these preferred embodiments, when the seismic energy strikes the water surface, it is reflected and/or dispersed in a direction away from the seismic sensors, thereby reducing the ghost effect of the air-water interface.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF A PREFERRED EMBODIMENT

Figure 1:
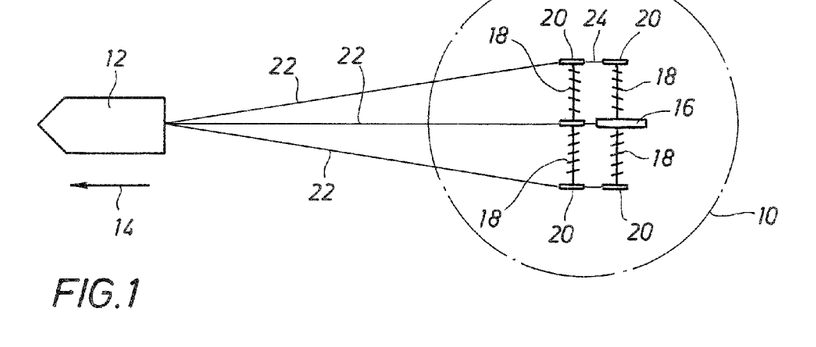
FIG. 1 is a top-down plan view of an embodiment of the system.

FIG. 1 depicts a system 10 for breaking up the surface of the water above a seismic array system. The system 10 is shown in greater detail in FIG. 2. The system 10 is preferably towed behind a vessel 12 in the direction shown by an arrow 14. A conventional seismic system includes a number of airgun floats 16 which provide buoyancy for the airguns, which generate the seismic signal for exploration. It will be understood by those of skill in the art that other sources of a seismic signal may be employed within the scope and spirit of the invention. As shown in FIG. 1, a plurality of aquafoils 18 are mounted between system floats 20 which are towed behind the vessel 12 on dedicated tow cables 22. Adjacent systems floats 20 are also joined together with a set of supplementary tow cables 24. The floats 20 are referred to a system floats to distinguish them from other buoyancy devices commonly used in seismic exploration system, such as for example airgun floats. Thus, it can be seen from FIG. 1 that the system floats are arranged in rows and columns, with a number of the aquafoils arranged between each adjacent system float in a row and a supplementary tow cable 24 between each adjacent system float in a column.

Each aquafoil 18, in the shape of a plow, rides at the surface of the water, creating perturbations on the surface of the water. These perturbations deflect and disperse the upwardly moving seismic signal as it strikes the undersides of the air-water interface.

Figure 2:
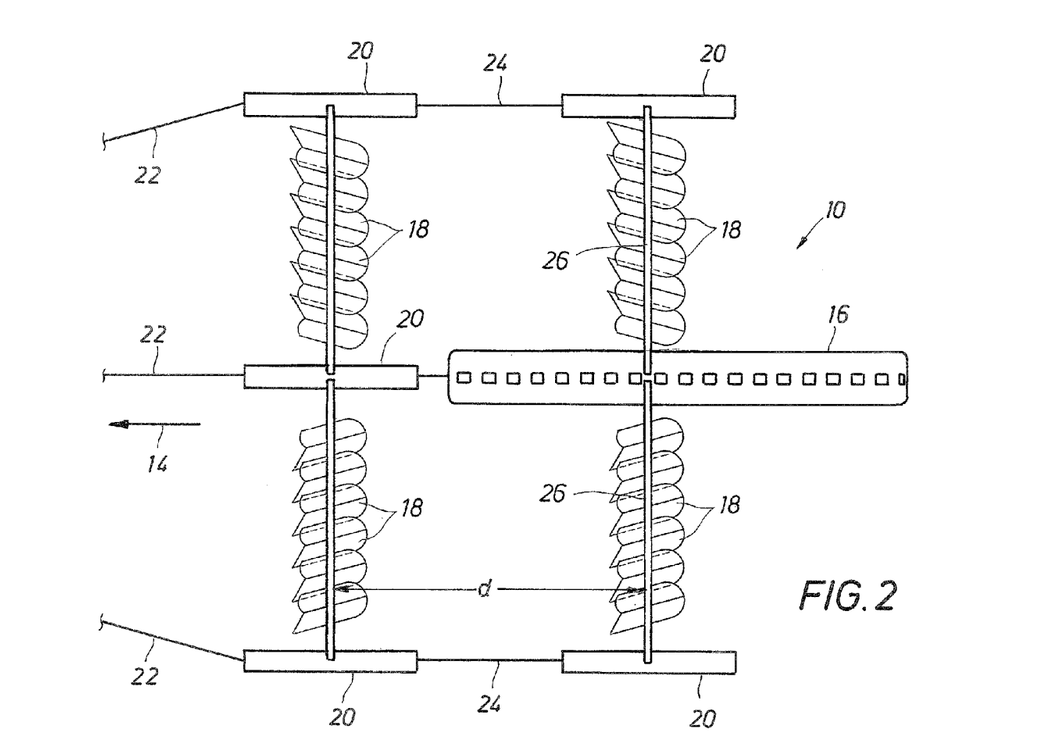
FIG. 2 is a detail view of the system of FIG. 1.
Figure 3A:
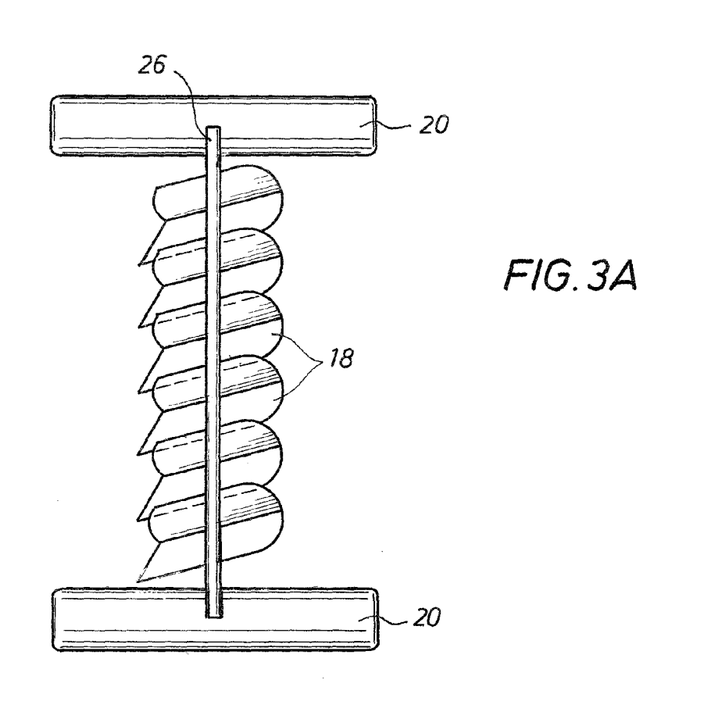
FIG. 3A is a top-down plan view of one set of aquafoils supported between floats, in accordance with the teachings of this invention.
Figure 3B:
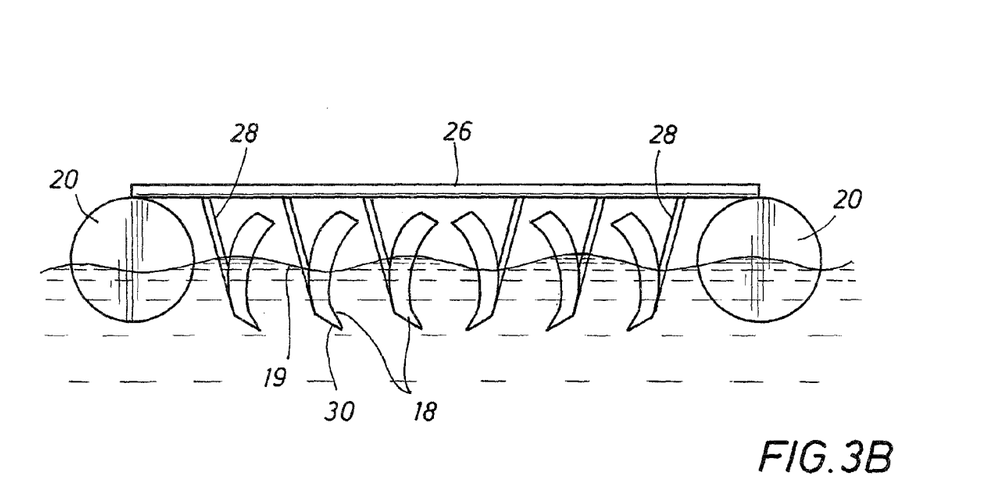
FIG. 3B is an elevation view of the arrangement of FIG. 3A, as seen from behind.

FIGS. 2, 3A, and 3B illustrate more detail. As the vessel tows the system 10 in the direction of the arrow 14, the aquafoils 18 dig into the surface of the water 19. In FIG. 2, six such aquafoils 18 are illustrated as mounted on a support 26, with one such support supported at each end by a respective float 20, or, between a float 20 and the gun float 16. A horizontal distance d is defined as the spacing between the supports 26 so that the surface of the water is still perturbed just in front of the next trailing support and plurality of aquafoils 18 at the design speed of advance of the seismic exploration system.

As shown in FIGS. 3A and 3B, each aquafoil 18 is supported on the support 26, preferably suspended below the support 26 on a support arm 28. Thus, a bottom end 30 of each aquafoil extends below the surface 19 of the water, thereby perturbing the surface. The aquafoil elements 18 may each be unidirectional, as illustrated in FIG. 3B, with an equal number of aquafoils directed to the port side as to the starboard side, thereby equalizing side-to-side force against the system. Alternatively, each aquafoil 18 may be bi-directional, as desired.

Figure 4:
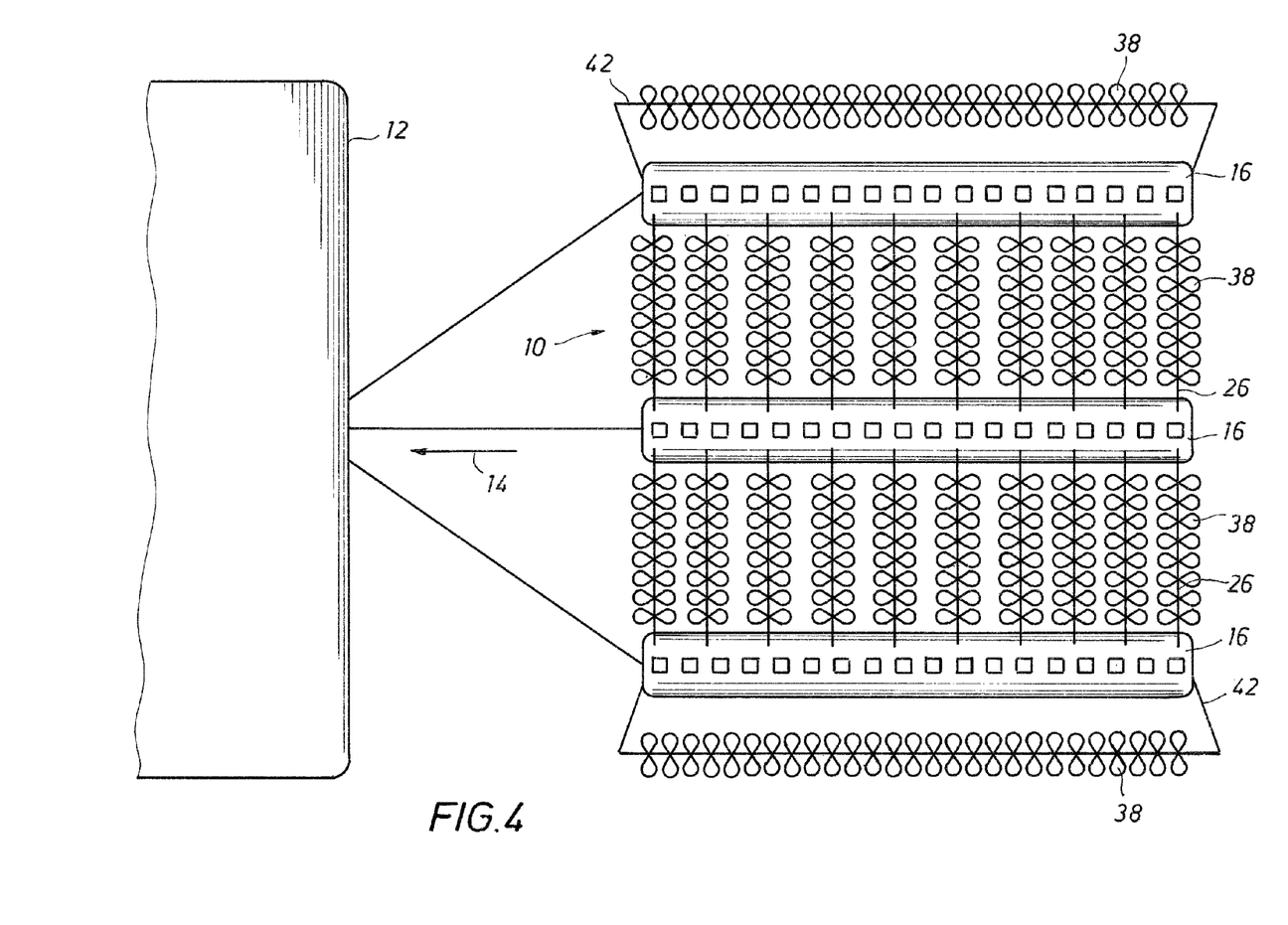
FIG. 4 is a plan view of a system including propellers as perturbation elements.

FIG. 4 depicts a different kind of perturbation element that is strung between floats 16. In this embodiment, a plurality of propellers 38 is mounted to the support 26 for free rotational movement. The propellers 38 are passive, in that they are not driven by an external prime mover, but are rotated by the movement of the vessel 12 through the water. In a manner similar to the aquafoils, the propellers 38 extend into the surface of the water to create perturbations therein. In the embodiment of FIG. 4, the supports 26 are mounted at either end to the gun arrays floats 16. Note also that, preferably, a plurality of propellers 38 is mounted to a fore-and-aft oriented support shaft 42, so that perturbations of the water surface are created outboard of the outermost floats 16.

Figure 5:
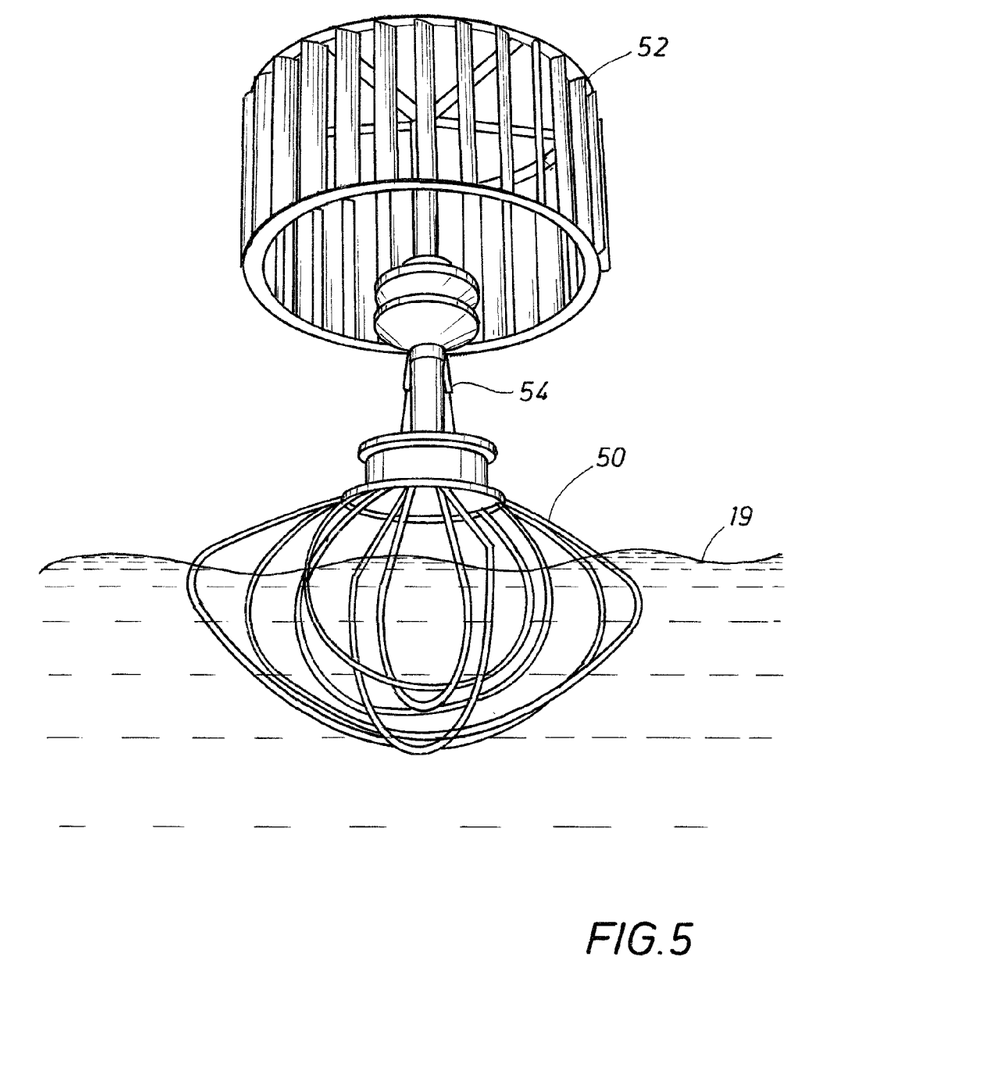
FIG. 5 is a detail view of a wire whip perturbation element.

Rather than the propellers of FIG. 4, a different type of perturbation element may be used, as shown in FIG. 5. It is to be understood that a plurality of such elements is to be mounted to the respective supports 26 and 42, as shown in FIG. 4. The element of FIG. 5 comprises a wire whip 50, which extends into the surface 19 of the water. The whip is driven by a vertical axis wind turbine 52, rotated by the movement of the turbine through air above of surface of the water. The wind turbine 52 is joined to the wire whip with a vertical axle 54. As the turbine 52 rotates, the wire whip agitates the water surface, thereby deflecting and dispersing the seismic signal as it strikes the underside of the air-water interface.

Figure 6:
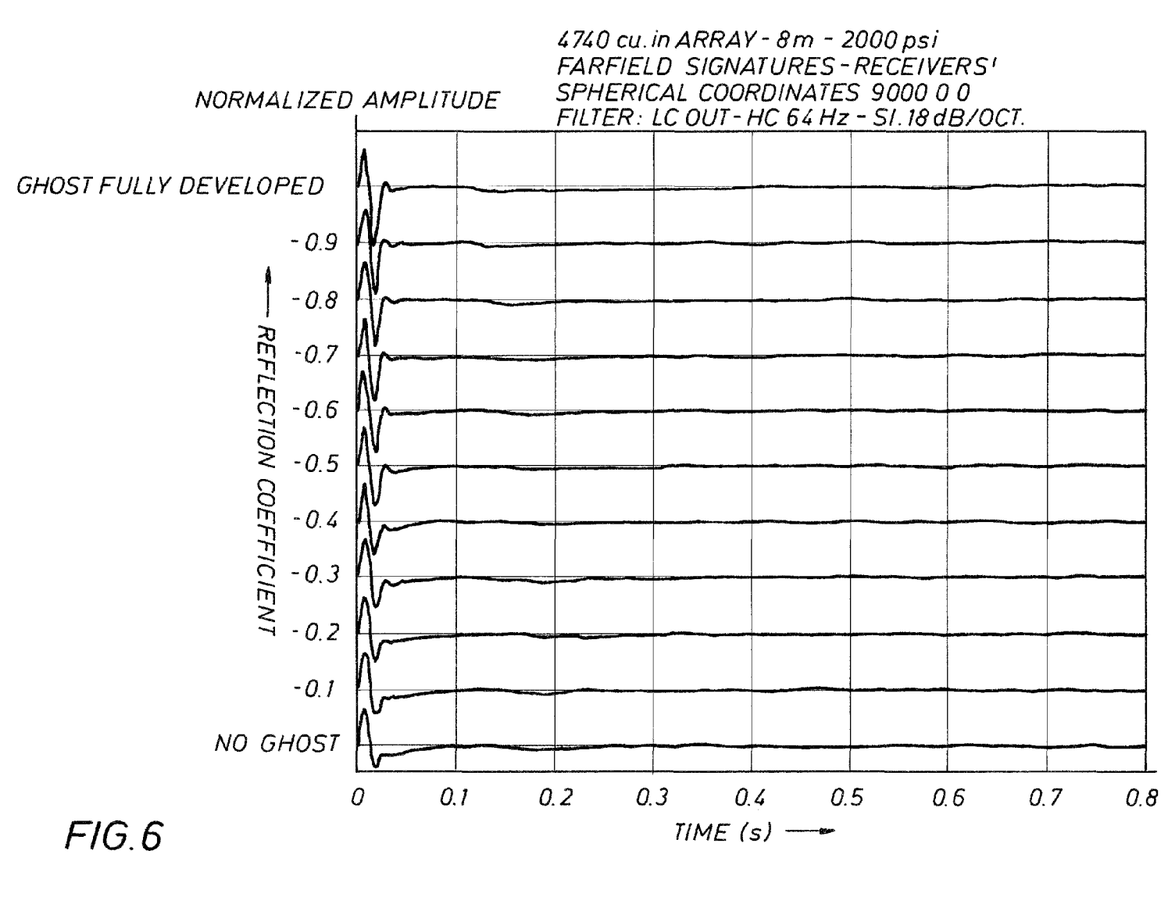
FIGS. 6 through 11 are various plots, simulating the effect of breaking up the surface using the present invention.
Figure 7:
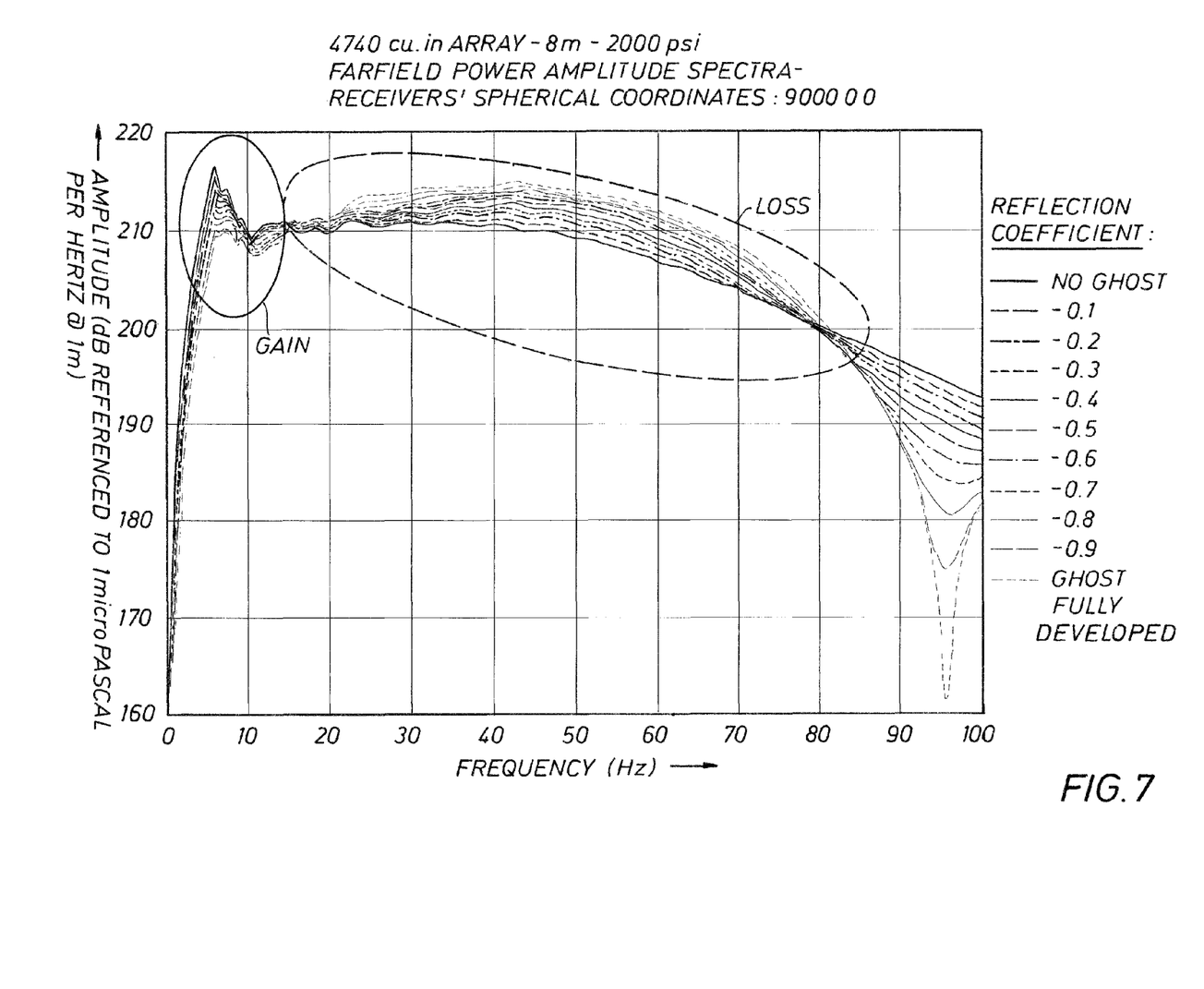
Figure 8:
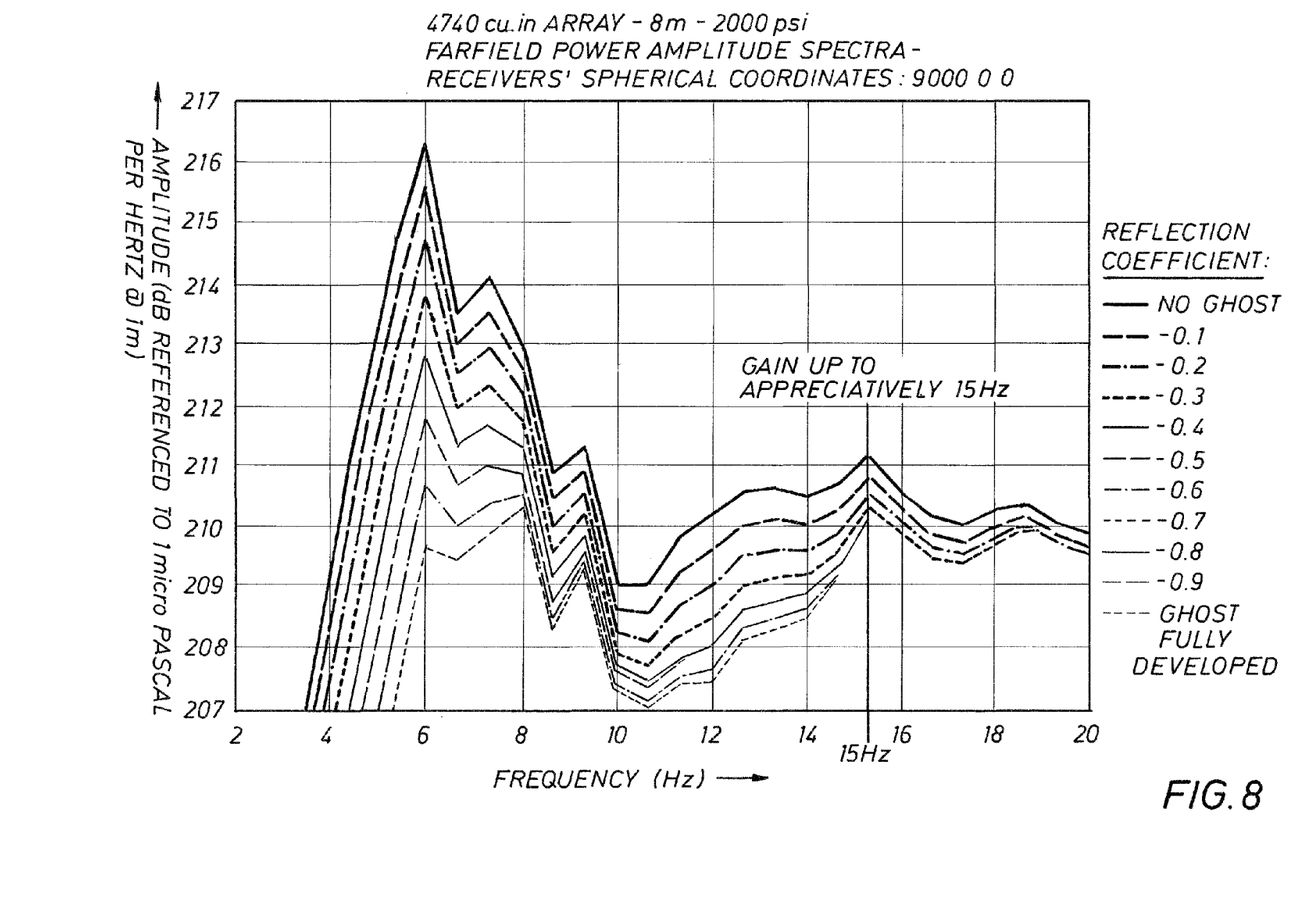
Figure 9:
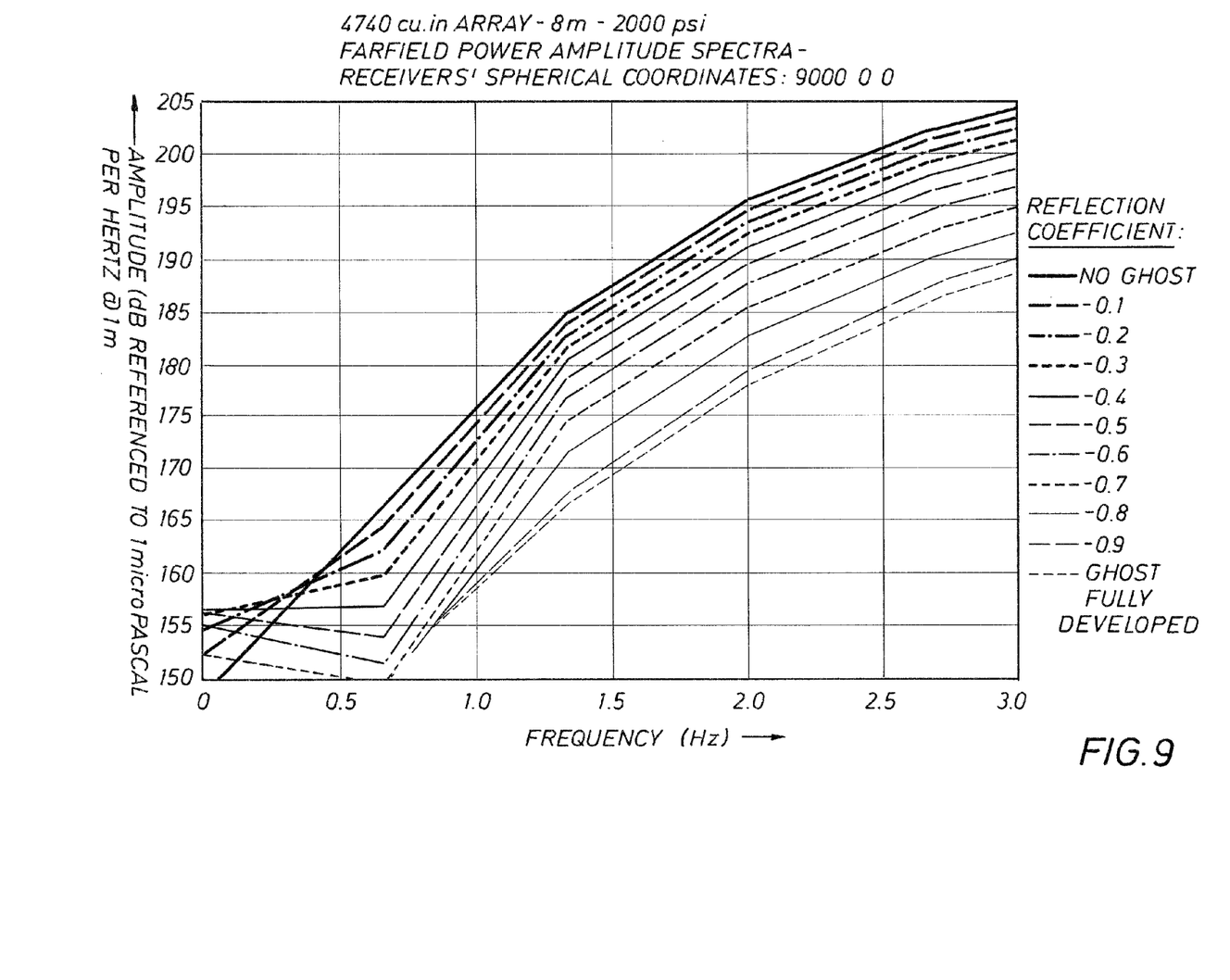
Figure 10:
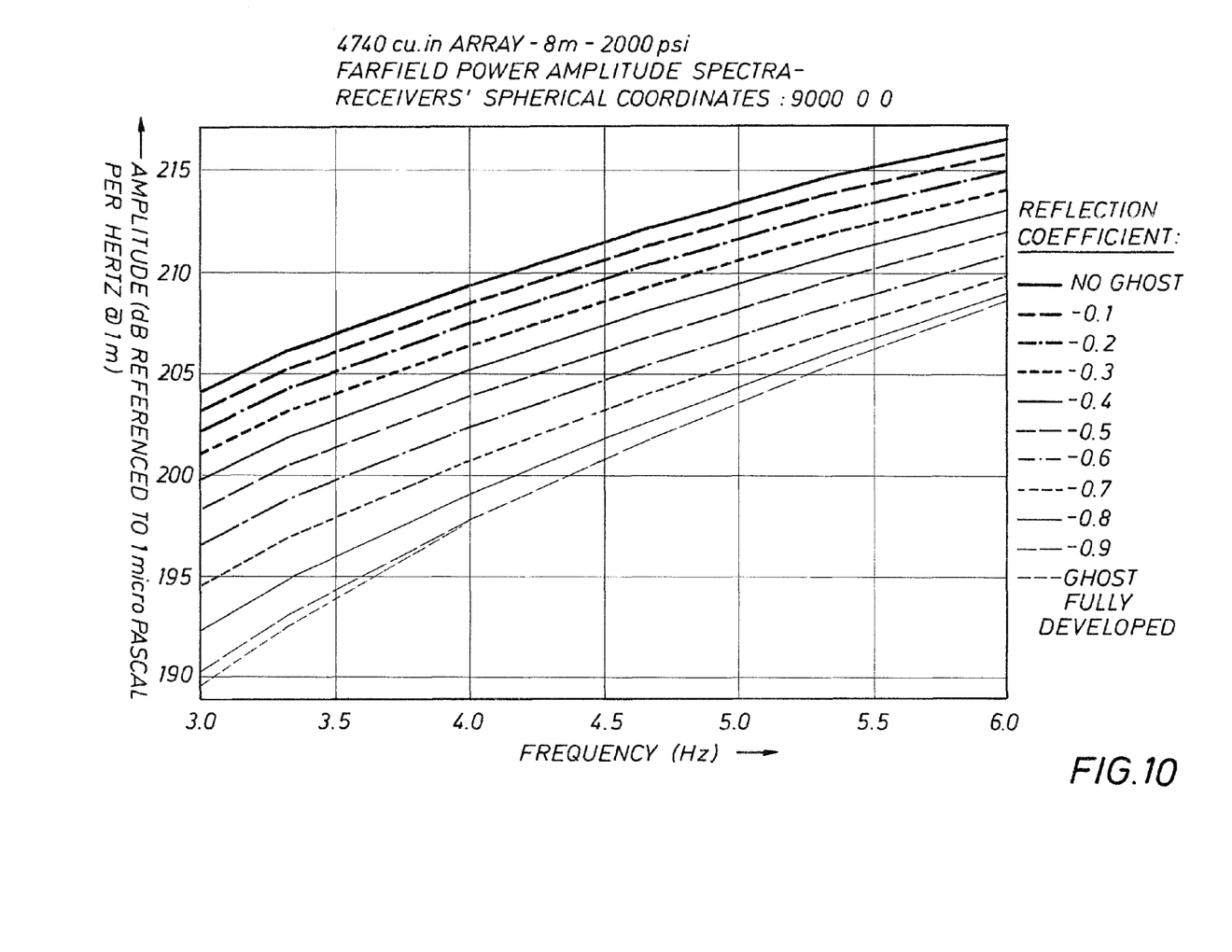
Figure 11:
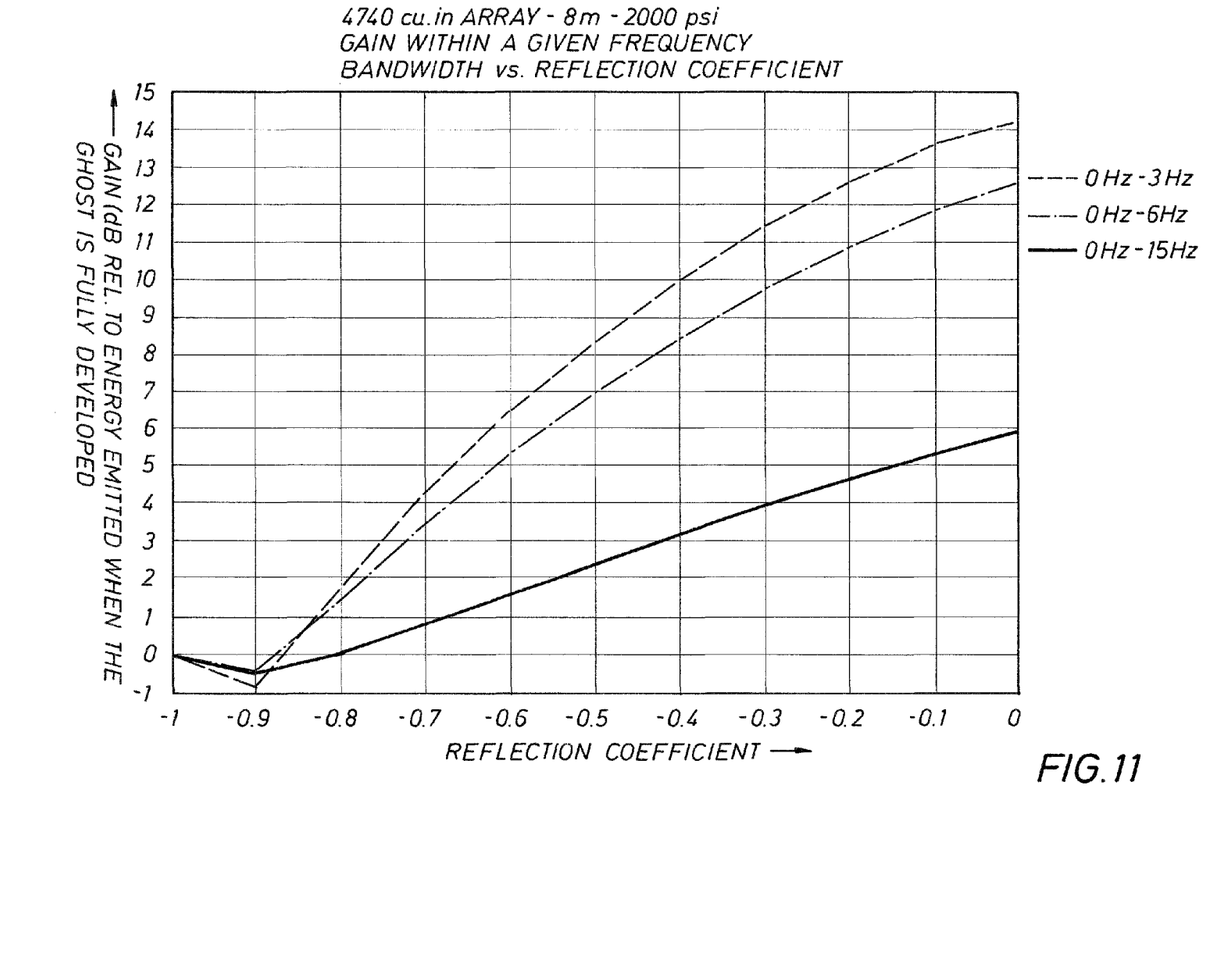

Finally, FIGS. 6 through 11 illustrate the benefits of the system just described. FIG. 6 shows a family of traces, relative to time, with various reflection coefficients of the air-water interface. Using these same reflection coefficients, FIG. 7 shows a family of curves of farfield power amplitude spectra. FIG. 8 is a detail of the family of curves of FIG. 7, with emphasis on one of the gain regions of the curves. FIG. 9 shows the family of curves, with emphasis on the low frequency portion of the spectrum out to three Hz, to illustrate that the useful portion of the spectrum is preserved. FIG. 10 extends FIG. 9 from 3 to 6 Hz. FIG. 11 depicts gain over three frequency spectra as a function of reflection coefficient.

Thus, it should now be apparent to those of skill in the art that the present invention comprises a system for mechanically altering the geometry of the sea surface to reduce the effects of ghosts. The invention further comprises method of reducing ghost effects in a marine seismic exploration system comprising the step of mechanically altering the geometry of the surface. Various means may be used, within the scope and spirit on this invention, to create the alterations in the geometry of the sea surface, in addition to those disclosed herein.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A system for reducing the ghost effects at an air/water interface in a marine seismic exploration system including a seismic exploration vessel at sea, the system comprising:
   a. a plurality of system floats arranged in rows and columns, including a leading row;
   b. a perturbation element support suspended between each adjacent pair of system floats in each row;
   c. towing cables joining the vessel to the leading row of system floats;
   d. supplementary towing cables between each adjacent float in a column; and
   e. a plurality of perturbation elements mounted on each perturbation element support, the plurality of perturbation elements extending through the air/water interface.

2. The system of claim 1, wherein each of the plurality of perturbation elements is an aquafoil.

3. The system of claim 1, wherein each of the plurality of perturbation elements is a passive propeller.

4. The system of claim 1, wherein each of the plurality of perturbation elements is a wire whip.

* * * * *